United States Patent
Abramoski et al.

(10) Patent No.: US 10,829,143 B2
(45) Date of Patent: Nov. 10, 2020

(54) MOTOR VEHICLE STEERING COLUMN ASSEMBLY

(71) Applicant: Ford Global Technologies, LLC, Dearborn, MI (US)

(72) Inventors: Edward Joseph Abramoski, Canton, MI (US); Paul Mark Marable, Essex (GB); Pieter Christopher Van Ast, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 257 days.

(21) Appl. No.: 15/991,216

(22) Filed: May 29, 2018

(65) Prior Publication Data

US 2018/0346013 A1    Dec. 6, 2018

(30) Foreign Application Priority Data

May 30, 2017   (GB) .................................. 1707555.7

(51) Int. Cl.
| | |
|---|---|
| *B62D 1/19* | (2006.01) |
| *B60R 21/05* | (2006.01) |
| *B60R 21/045* | (2006.01) |
| *B60R 21/055* | (2006.01) |
| *B60K 37/00* | (2006.01) |
| *B60R 21/09* | (2006.01) |

(Continued)

(52) U.S. Cl.
CPC ............... *B62D 1/19* (2013.01); *B60K 35/00* (2013.01); *B60K 37/00* (2013.01); *B60K 37/02* (2013.01); *B60R 21/045* (2013.01); *B60R 21/05* (2013.01); *B60R 21/055* (2013.01); *B60R 21/09* (2013.01); *B60K 2370/63* (2019.05); *B60K 2370/685* (2019.05); *B60K 2370/782* (2019.05)

(58) Field of Classification Search
CPC ................ B60K 35/00; B60K 2370/63; B60K 2370/685; B60K 2370/782; B60K 37/02; B60K 37/00; B60R 21/09; B60R 21/055; B60R 21/05; B60R 21/045; B62D 1/19
USPC ......................................................... 280/777
See application file for complete search history.

(56) References Cited

U.S. PATENT DOCUMENTS

| | | | |
|---|---|---|---|
| 3,815,437 | A | 6/1974 | Martin |
| 4,117,741 | A | 10/1978 | Yazane et al. |

(Continued)

FOREIGN PATENT DOCUMENTS

| | | |
|---|---|---|
| CN | 101402320 A | 4/2009 |
| EP | 2045115 A1 | 4/2009 |

(Continued)

*Primary Examiner* — Paul N Dickson
*Assistant Examiner* — Hilary L Johns
(74) *Attorney, Agent, or Firm* — Brooks Kushman P.C.; Frank MacKenzie (57) ABSTRACT

An assembly is disclosed, in which a rigid ramp is rigidly connected to a tubular upper part of a steering column for interaction with a displaceable part of an instrument panel. Interaction between the tubular upper part and the displaceable part moves the displaceable part in a reliable manner out of the way during an impact scenario, during which a steering wheel is displaced towards the instrument panel. Displacement of the displaceable part by the rigid ramp permits the steering wheel to be fully displaced without the instrument panel hindering such motion.

20 Claims, 5 Drawing Sheets

(51) Int. Cl.
 *B60K 35/00* (2006.01)
 *B60K 37/02* (2006.01)

(56) References Cited

U.S. PATENT DOCUMENTS

| | | | | |
|---|---|---|---|---|
| 4,397,480 | A | * | 8/1983 | Ouchi .................... B62D 1/195 |
| | | | | 280/752 |
| 5,280,956 | A | | 1/1994 | Tanaka et al. |
| 6,068,295 | A | * | 5/2000 | Skabrond ............... B60K 37/00 |
| | | | | 280/775 |
| 7,913,790 | B2 | * | 3/2011 | Tanaka ................... B60K 37/00 |
| | | | | 180/90 |
| 8,065,931 | B1 | | 10/2011 | Marable et al. |
| 8,702,126 | B2 | | 4/2014 | Gloden et al. |
| 8,764,091 | B2 | | 7/2014 | Clark et al. |
| 8,939,493 | B1 | | 1/2015 | Barthlow et al. |
| 9,862,402 | B2 | * | 1/2018 | Earl ..................... B62D 25/145 |
| 2012/0125708 | A1 | * | 5/2012 | Yamada ................ B60R 21/045 |
| | | | | 180/443 |

FOREIGN PATENT DOCUMENTS

| | | |
|---|---|---|
| JP | H07246858 A | 9/1995 |
| WO | 0017035 A1 | 3/2000 |
| WO | 2016177779 A1 | 11/2016 |

* cited by examiner

MOTOR VEHICLE STEERING COLUMN ASSEMBLY

CROSS-REFERENCE TO RELATED APPLICATION

This application claims foreign priority benefits under 35 U.S.C. § 119(a)-(d) to GB Application 1707555.7 filed May 30, 2017, which is hereby incorporated by reference in its entirety.

TECHNICAL FIELD

This disclosure relates to a steering column assembly for a motor vehicle.

BACKGROUND

It is well known to provide a motor vehicle with a steering column assembly in which, during an impact scenario, a steering column supporting a steering wheel can move away from a driver (referred to as "ride down" or "stroking" of the steering column) so as to reduce effect of an impact.

U.S. Pat. Nos. 8,065,931 and 8,702,126 provide two examples of steering column assemblies having ride-down mechanisms.

It is a problem with such an arrangement that parts of the steering column assembly come into contact with an adjacent part of an instrument panel thereby restricting travel of the steering wheel away from the driver.

It has therefore been proposed in U.S. Pat. No. 8,764,091 to provide a detachable part that can be pushed off by part of a trim shroud when the steering column collapses.

However, in some circumstances a stiffness of the trim shroud is such that this arrangement is not successful in providing full clearance between the steering column and the instrument panel, and some restriction to stroking of the steering column remains.

SUMMARY

It is an object of this disclosure to provide a steering column assembly that provides more consistent, full stroking of a steering column in an impact.

According to a first aspect of the disclosure, there is provided a motor vehicle steering column assembly comprising a steering column having a tubular upper member, an upper steering shaft located within the tubular upper member, a steering wheel driveably connected to the upper steering shaft, a ride down mechanism to permit the steering wheel to be displaced in event of an impact towards an adjacent instrument panel from a normal position to a fully displaced position, and at least one rigid ramp rigidly connected to the tubular upper member having an inclined face for interaction with a displaceable part of the instrument panel. The interaction between the inclined face and the displaceable part moves the displaceable part of the instrument panel away from the tubular upper member of the steering column in the event of an impact. Moving the displaceable part away from the tubular upper member facilitates displacement of the steering wheel to a fully displaced position, wherein the tubular upper member has a rigid mounting plate for a column switch assembly fastened thereto and the at least one rigid ramp is rigidly connected to the tubular upper member by the rigid mounting plate.

The rigidly connected rigid ramp, via the rigid mounting plate, has the advantage that the rigidity of the ramp ensures a consistent and reliable interaction to occur thereby reducing a possibility of incomplete clearance that prevents the steering wheel from moving to the fully displaced position.

The at least one rigid ramp may be formed as an integral part of the rigid mounting plate.

The rigid mounting plate may have a bent over, upper edge that forms the at least one rigid ramp.

Alternatively, the at least one rigid ramp may be formed by one or more separate rigid ramp members fastened to the rigid mounting plate.

Each separate rigid ramp member may be fastened to the rigid mounting plate by welding and adhesive bonding.

As yet another alternative, the column switch assembly may include a rigid housing and the at least one rigid ramp may be formed as an integral part of the rigid housing.

There may be a single elongate rigid ramp.

According to a second aspect of the disclosure there is provided an instrument panel and steering column assembly constructed in accordance with said first aspect of the disclosure, wherein the displaceable part of the instrument panel has an inclined abutment surface facing the at least one rigid ramp of the steering column assembly.

The displaceable part of the instrument panel may be hingedly connected to a main part of the instrument panel at a position spaced away from the inclined abutment surface.

The displaceable part of the instrument panel may be connected to a main part of the instrument panel by one or more frangible connections.

Interaction between the at least one rigid ramp and the inclined abutment surface may cause the displaceable part of the instrument panel to be displaced away from the tubular upper member of the steering column assembly.

The interaction between the at least one rigid ramp and the inclined abutment surface may be direct contact between the inclined abutment surface and the at least one rigid ramp.

There may be a single rigid ramp and the direct contact is between the inclined abutment surface on the displaceable part and the inclined face on the rigid ramp.

The disclosure will now be described by way of example with reference to the accompanying drawings.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
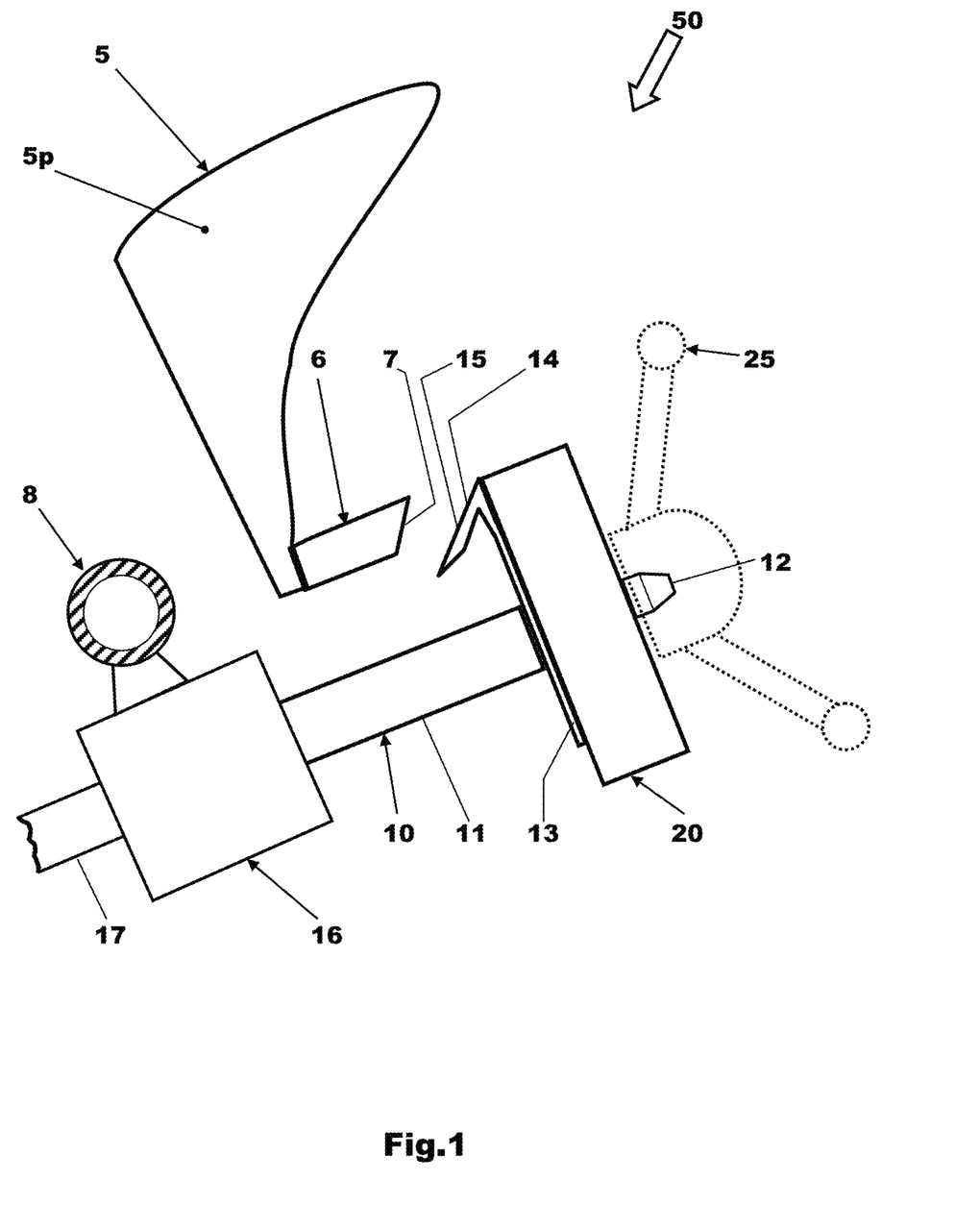
FIG. 1 is a schematic side view of a first embodiment of a steering column and instrument panel assembly in a normal pre-displaced state.
Figure 2:
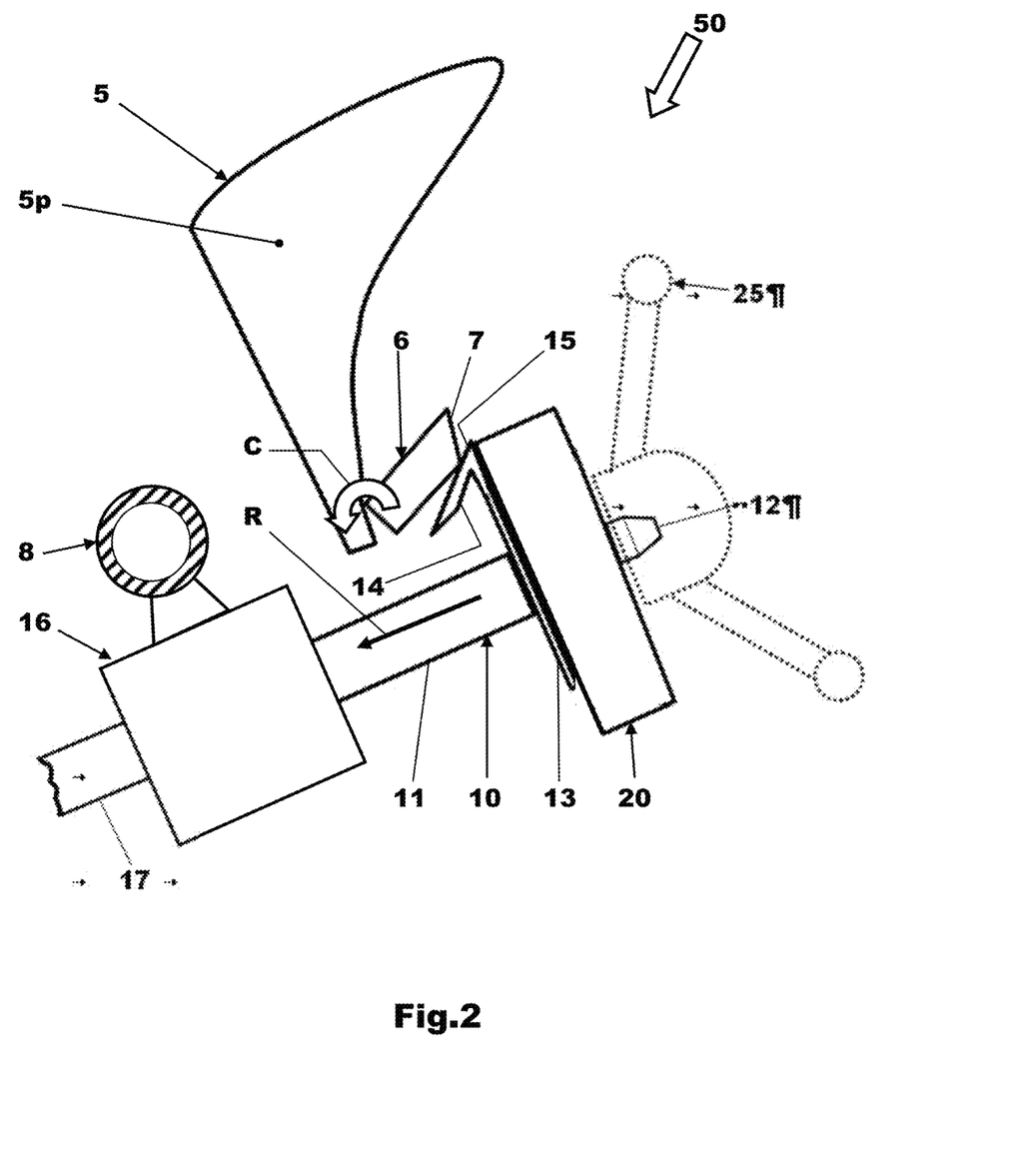
FIG. 2 is a schematic side view showing the steering column assembly in a partially displaced state.

With particular reference to FIGS. 1 and 2, there is shown a first embodiment of an assembly 50 comprising an instrument panel 5 and a steering column 10.

The instrument panel 5 includes a main part 5p and displaceable trim member 6 attached near a lower edge of the main part 5p. The trim member 6 has an inclined abutment surface 7 facing away from the main part 5p of the instrument panel 5.

The steering column 10 comprises a non-rotating rigid tubular upper column 11, a rotatable inner upper column shaft 12 located within the tubular outer column 11, a steering wheel 25 (shown in dotted outline) fastened to one end of the inner upper column shaft 12, a lower column 17, a rigid mounting plate 13 fastened to the tubular upper column 11, a column switch assembly 20 attached to the rigid mounting plate 13 by a number of fasteners (not shown) and a ride down mechanism assembly 16 to allow the steering wheel 25 to move away from a driver in an impact.

The ride down mechanism assembly 16 is attached to a structural part 8 of a motor vehicle (not shown) of which the assembly 50 forms a part.

The rigid metal mounting plate 13 has, extending along an upper edge thereof, a rigid ramp 14, which in the case of the embodiment shown is formed as an integral part of the rigid mounting plate 13 by bending over the upper edge of the rigid mounting plate 13. It will be appreciated that if the rigid mounting plate 13 is an extruded metal component, then the rigid ramp 14 could be formed as an integral part of the extrusion forming the rigid mounting plate 13. It will be further appreciated that the rigid ramp 14 can extend along a full width of the mounting plate 13, for only part of the width, or there could be more than one ramp 14.

The rigid ramp 14 has an inclined face 15 that faces the inclined abutment surface 7 on the trim member 6 and is positioned for interaction therewith. That is to say, the inclined abutment surface 7 faces the inclined face 15 on the rigid ramp 14 of the steering column 10.

In the event of an impact, the upper parts 11, 12 and 25 of the steering column 10 move away from the driver as indicated by arrow 'R' on FIG. 2 causing the inclined face 15 on the rigid ramp 14 to contact the inclined abutment surface 7 on the trim member 6 thereby pushing the trim member 6 upwards away from the tubular upper column 11 and, in the case of this example, causing the trim member 6 to rotate in a counter-clockwise direction about a hinged connection (not shown) used to connect the trim member 6 to the main part 5p of the instrument panel 5 as indicated by arrow 'C' on FIG. 2. Use of a hinged connection has an advantage that the trim member 6 remains attached to the main part 5p of the instrument panel 5 and does not become detached. Maintaining attachment between the trim member 6 and the main part 5p reduces a risk that the trim member 6 interferes with the ride down of the steering column 10 and prevents the steering column 10 from moving about in a passenger compartment (not shown) of the motor vehicle.

However, it will be appreciated that the trim member 6 in other embodiments not shown could be connected by one or more frangible connections and become detached when impacted against by the rigid ramp 14.

One of the advantages of this embodiment of the disclosure is that the ramp 14 is formed from a rigid material such a steel or aluminum and so as not to easily deform to ensure that the trim member 6 is reliably moved out of the way when impacted by the inclined ramp 14.

Due to an angle of the inclined face 15 on the rigid ramp 14 and an angle of the complementary inclined abutment surface 7 on the trim member 6, a force (not shown) urging the trim member 6 upwards is produced when contact occurs between the inclined face 15 and the inclined abutment surface 7.

Furthermore, because the rigid mounting plate 13 is fastened directly to the tubular upper column 11, a rigid support for the rigid mounting plate 13 and the ramp 14 is provided that is more than able to resist the forces required to free the trim member 6 from any frangible connections (not shown) used to hold it in position during normal use.

Therefore, the rigid ramp 14 can extend across a full width of steering column 10 thereby ensuring defined contact loads, is very rigid and substantially non-deformable and designed to contact the instrument panel 5 in one or more defined positions so as to focus impact loads to defined weakened areas. Furthermore, any trim under the instrument panel 5 can be constructed to offer maximum interaction with the rigid ramp 14 without risk to styling or packaging.

Figure 3:
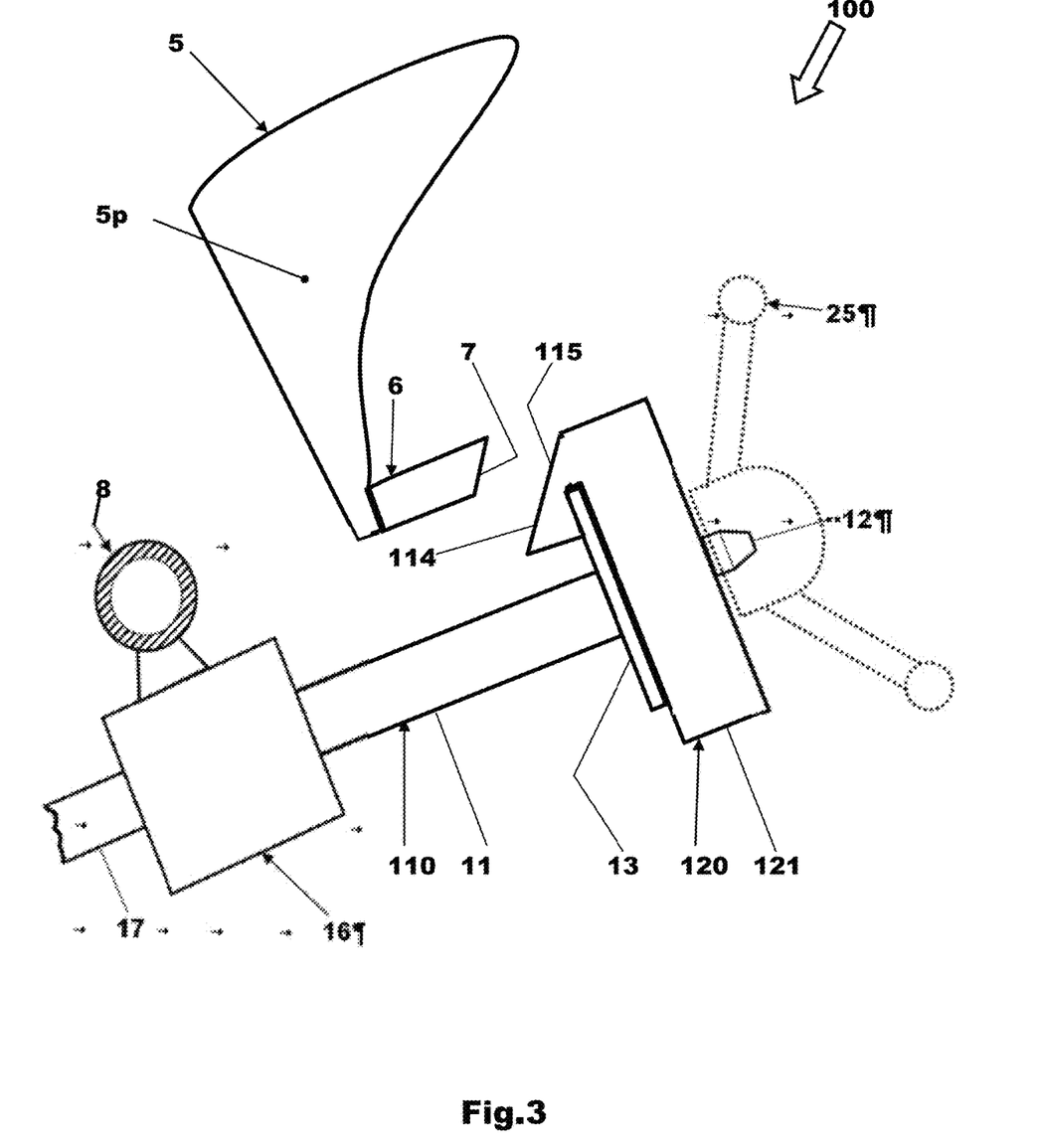
FIG. 3 is a schematic side view of a second embodiment of a steering column and instrument panel assembly in a normal pre-displaced state.
Figure 5:
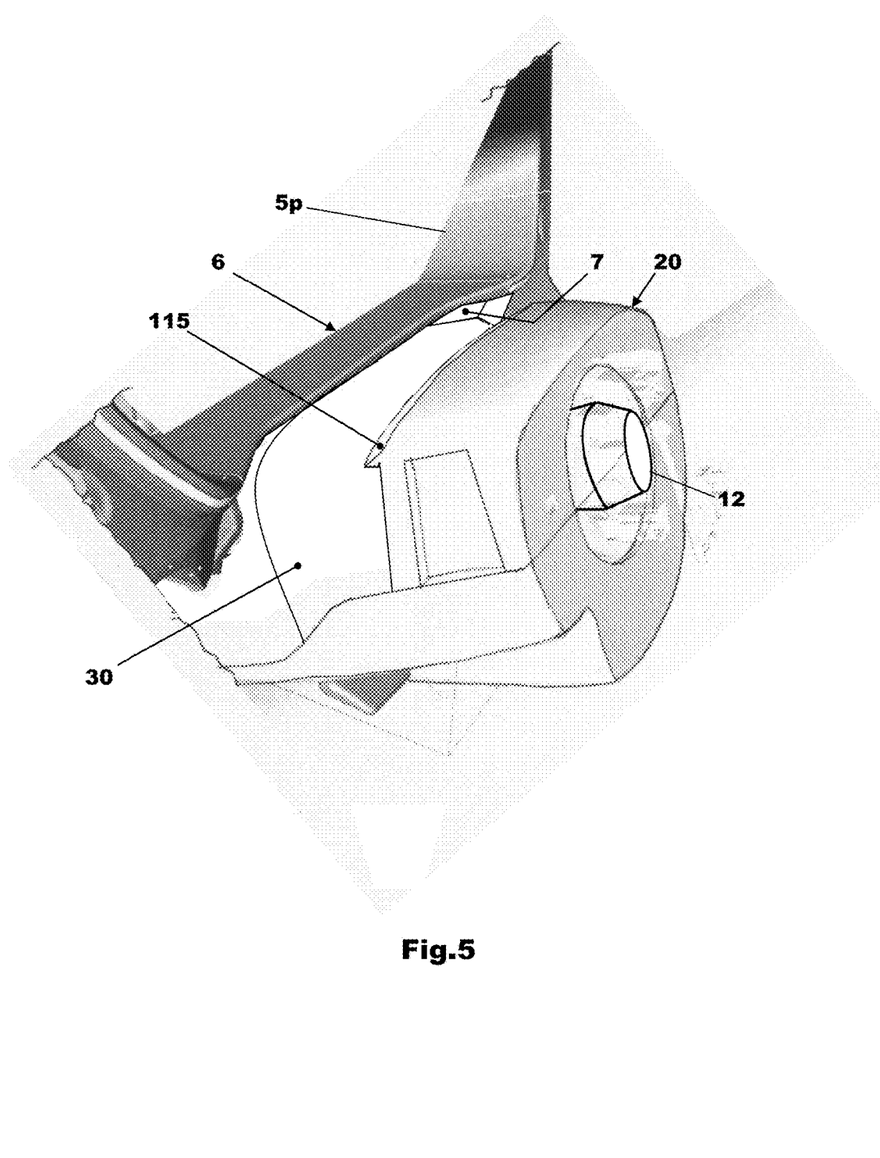
FIG. 5 is a pictorial view of the steering column and instrument panel assembly shown in FIG. 3.

With particular reference to FIGS. 3 and 5, there is shown a second embodiment of an assembly 100 comprising an instrument panel 5 and a steering column assembly 110.

As before the instrument panel 5 includes a main part 5p and displaceable trim member 6 attached near to a lower edge of the main part 5p and the trim member 6 has an inclined abutment surface 7 facing away from the main part 5p of the instrument panel 5.

As before, the steering column assembly 110 comprises a non-rotating rigid tubular upper column 11, a rotatable inner upper column shaft 12 located within the tubular upper column 11, a steering wheel 25 (shown in dotted outline) fastened to one end of the inner upper column shaft 12, a lower column 17, a rigid mounting plate 13 fastened to the tubular upper column 11, a column switch assembly 120 attached to the rigid mounting plate 13 by a number of fasteners (not shown) and a ride down mechanism assembly 16 to allow the steering wheel 25 to move away from a driver in an impact.

As before, the ride down mechanism assembly 16 is attached to a structural part 8 of a motor vehicle (not shown) of which the assembly 100 forms a part.

The column switch assembly 120 has extending along an upper edge thereof a rigid ramp 114, which, in the case of the embodiment shown, is formed as an integral part of the column switch assembly 120 by being formed as an integral part of a column switch housing 121. It will be further appreciated that the rigid ramp 114 can extend along a full width of the column switch housing 121 or for only part of the width.

The rigid ramp 114 has an inclined face 115 that faces the inclined abutment surface 7 on the trim member 6 and is positioned for interaction therewith. The inclined abutment surface 7 on the trim member 6 is arranged to face the rigid ramp 114.

In the event of an impact the upper parts 11, 12 of the steering column assembly 110 move away from the driver causing the inclined face 115 on the rigid ramp 114 to contact the inclined abutment surface 7 on the trim member 6 thereby pushing the trim member 6 upwards away from the tubular upper column 11. In the case of this example, pushing the trim member 6 upwards causes the trim member 6 to rotate in a counter-clockwise direction about a hinged connection (not shown) used to connect the trim member 6 to the main part 5p of the instrument panel 5. As before, use of a hinged connection has an advantage that the trim member 6 remains attached to the main part 5p of the instrument panel 5 and does not become detached when impacted by the ramp 114 thereby reducing ae risk of the trim member 6 interfering with the ride down of the steering column assembly 110 or moving about in the passenger compartment (not shown) of the motor vehicle. However, it will be appreciated that the trim member 6 in other embodiments could be connected to the main part 5p of the instrument panel 5 by one or more frangible connections as in such a case would become detached when impacted by the rigid ramp 114.

One of the advantages of the disclosure is that the ramp 114 is formed from a rigid material and is rigidly connected to the tubular upper column 11. The rigid material and connection allow the ramp to be not easily deformed, thereby ensuring that the trim member 6 is reliably moved out of the way when it is impacted by the inclined ramp 114.

Due to an angle of the inclined face 115 on the rigid ramp 114 and an angle of the complementary inclined abutment surface 7 on the trim member 6, a force urging the trim member 6 upwards is produced when contact occurs between the inclined face 115 and the inclined abutment surface 7.

Furthermore, because the rigid mounting plate 13 is fastened to the tubular upper column 11, a rigid support for the column switch housing 121 is provided that is more than able to resist forces required to free the trim member 6 from any frangible connections (not shown) used to hold it in position during normal use.

In FIG. 5, a shroud 30 made from a thin plastic material is shown overlying the rigid tubular upper column 11 so as to conceal it from view while allowing direct contact between the two inclined surfaces 7, 115.

Figure 4:
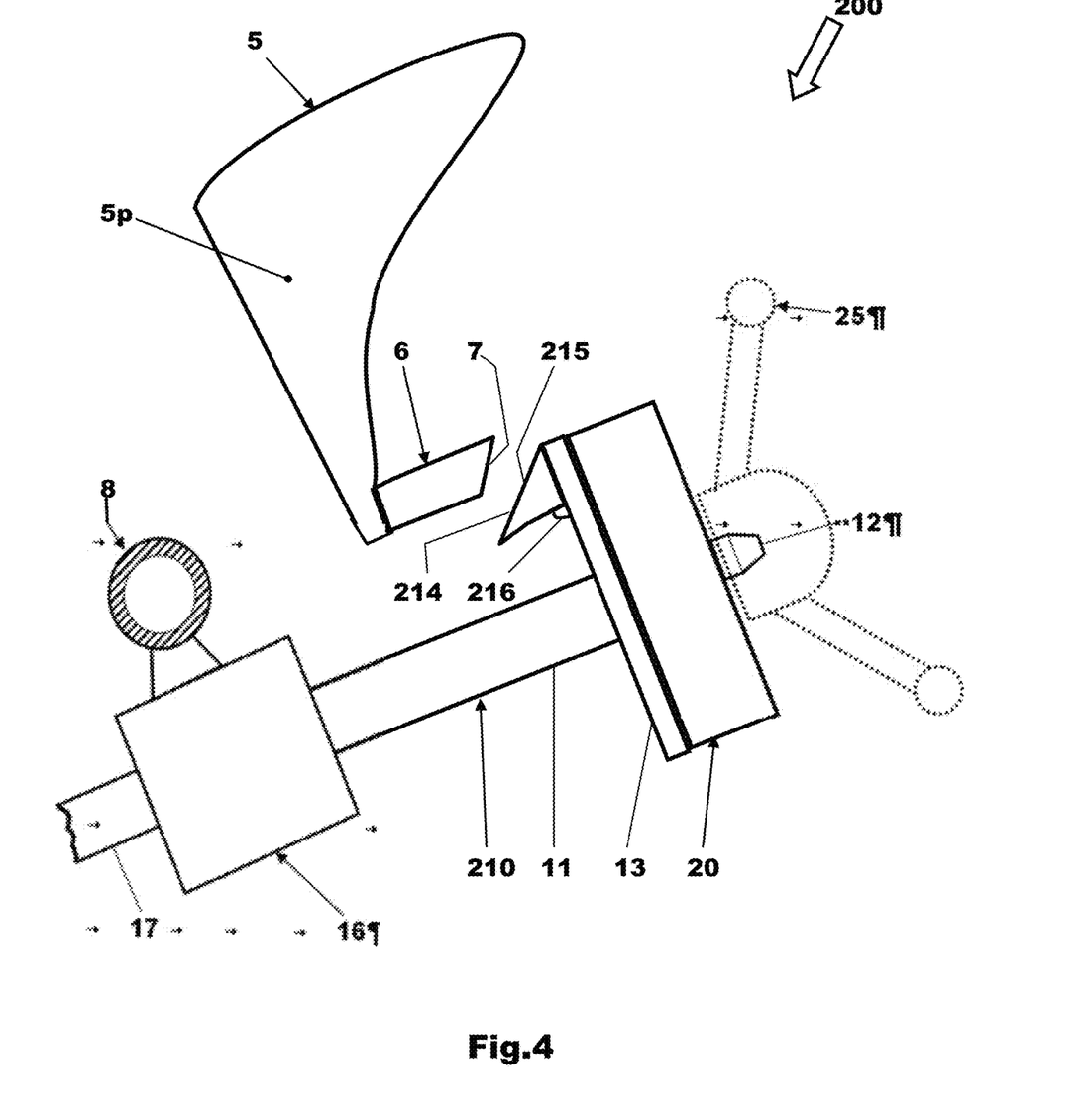
FIG. 4 is a schematic side view of a third embodiment of a steering column and instrument panel assembly in a normal pre-displaced state.

With particular reference to FIG. 4, there is shown a third embodiment of an assembly 200 comprising an instrument panel 5 and a steering column assembly 210 that is in most respects the same as that shown in FIGS. 1 and 2, and differs only in that the rigid ramp 214 is not formed as an integral part of the rigid mounting plate 13, but is made as a separate ramp member 214 that is fastened to the rigid mounting plate 13 by, in the case of this example, welding although, alternatively be adhesively bonded to the mounting plate 13.

The steering column assembly 210 is otherwise as previously described and so will not be described again in detail.

The rigid metal mounting plate 13 has, extending along an upper edge thereof, the rigid ramp 214 that, in the case of the embodiment shown, is welded to the upper edge of the rigid mounting plate 13 by, in the case of this example, a single welded joint 216. It will be appreciated that the disclosure is not limited to the use of such a single welded joint 216.

It will further be appreciated that the rigid ramp 214 can extend along a full width of the mounting plate 13, or for only part of the width. It will also be appreciated that several ramps 214 could be welded to the rigid mounting plate 13 spaced out across the width of the rigid mounting plate 13.

As before, the rigid ramp 214 has an inclined face 215 that faces the inclined abutment surface 7 on the trim member 6 and is positioned for interaction therewith.

In the event of an impact, the upper parts 11, 12 and 25 of the steering column 10 move away from the driver causing the inclined face 215 on the rigid ramp 214 to contact the inclined abutment surface 7 on the trim member 6 thereby pushing the trim member 6 upwards away from the tubular upper column 11. In the case of this example, pushing the trim member 6 upward causes the trim member 6 to rotate in a counter-clockwise direction about a hinged connection (not shown) used to connect the trim member 6 to the main part 5p of the instrument panel 5. The use of a hinged connection has an advantage that the trim member 6 remains attached to the main part 5p of the instrument panel 5, and does not become detached thereby reducing the risk of the trim member 6 interfering with the ride down of the steering column 10 or becoming detached allowing it to move about in the passenger compartment of the motor vehicle.

However, it will be appreciated that the trim member 6, in other embodiments not shown, could be connected to the main part 5p of the instrument panel 5 by one or more frangible connections and would become detached when impacted by the rigid ramp 14.

One of the advantages of this embodiment of the disclosure is that the ramp 214 is formed from a rigid material such a steel or aluminium and is not easily deformed thereby ensuring that the trim member 6 is reliably moved out of the way when it is impacted by the ramp 214. Due to an angle of the inclined face 215 on the rigid ramp 214 and an angle of the complementary inclined face 7 on the trim member 6, a force urging the trim member 6 upwards is produced when contact occurs between the inclined face 215 and the abutment surface 7.

Furthermore, because the rigid mounting plate 13 is connected to the tubular upper column 11, a rigid support for the ramp 214 is provided that is more than able to resist the forces required to free the trim member 6 from any frangible connections (not shown) used to hold it in position during normal use.

Although, in the case of the embodiments shown, there is no material between the two inclined surfaces 7, 215 allowing direct contact therebetween, it will be appreciated that a thin shroud or trim part covering the tubular upper column 11 could be interposed with the inclined face 215 of the rigid ramp 214 and the inclined abutment surface 7 on the displaceable trim member 6 without materially affecting the interaction between the rigid ramp 214 and the trim member 6.

It will be appreciated by those skilled in the art that although the disclosure has been described by way of example with reference to one or more embodiments, it is not limited to the disclosed embodiments and that alternative embodiments could be constructed without departing from the scope of the disclosure.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle comprising:
   an instrument panel having a main part;
   a displaceable trim member attached to the instrument panel adjacent to a lower edge of the main part, wherein the displaceable trim member extends outwardly from the lower edge of the main part to a distal free end, the distal free end forming an inclined abutment surface facing away from the main part;
   a steering column including a rotatable steering shaft located within an upper member and driveably connected to a steering wheel, wherein a ride-down permits steering wheel displacement towards the displaceable trim member; and a mounting plate fastened to the upper member of the steering column and supporting a column switch assembly, the mounting plate having a ramp with an inclined face, wherein the inclined face cooperates with the inclined abutment surface to move the displaceable trim member away from the upper member.

2. The vehicle as claimed in claim 1, wherein the mounting plate extends outwardly to an upper edge, wherein the upper edge is bent over to form the ramp.

3. The vehicle as claimed in claim 1, wherein the ramp is formed by one or more separate rigid ramp members fastened to the mounting plate.

4. The vehicle as claimed in claim 3, wherein each of the one or more separate rigid ramp members is fastened to the mounting plate by welding.

5. The vehicle as claimed in claim 3, wherein each of the one or more separate rigid ramp members is fastened to the mounting plate by adhesive bonding.

6. The vehicle as claimed in claim 1, wherein the column switch assembly includes a rigid housing and the ramp is formed as an integral part of the rigid housing.

7. The vehicle as claimed in claim 1, wherein the ramp is a single, elongate, rigid ramp.

8. The vehicle as claimed in claim 1 further comprising a shroud overlying the upper column so as to conceal it from view while allowing direct contact between the inclined face of the ramp and the inclined abutment surface.

9. The vehicle as claimed in claim 1 wherein a proximal end of the displaceable trim member is hingedly connected to the lower edge of the main part of the instrument panel such that the displaceable trim member rotates relative to the instrument panel.

10. A steering column assembly comprising:
a steering column including a steering shaft located within a tubular upper member and driveably connected to a steering wheel, wherein a ride-down permits displacement of the steering wheel toward a displaceable part of an instrument panel; and
a ramp having an inclined face to move the displaceable part away from the tubular upper member, wherein the ramp is formed as an integral part of a mounting plate, having a column switch assembly fastened thereto, that connects the ramp to the tubular upper member and faces an inclined abutment surface of the displaceable part;

wherein the displaceable part of the instrument panel is hingedly connected to a main part of the instrument panel at a position spaced away from the inclined abutment surface.

11. The steering column assembly as claimed in claim 10, wherein the ramp interacts with the inclined abutment surface to displace the displaceable part away from the tubular upper member of the steering column assembly, and wherein the displaceable part is a trim element for the instrument panel.

12. The steering column assembly as claimed in claim 11 wherein the ramp is formed by an edge of the mounting plate.

13. The steering column assembly as claimed in claim 10, wherein the ramp is a single ramp having an inclined face such that the inclined abutment surface directly contacts the inclined face.

14. A steering column comprising:
a steering shaft located within a steering column upper member, wherein a ride-down permits steering wheel displacement toward an instrument panel displaceable part; and
a ramp having an inclined face to move and rotate the displaceable part away from the upper member upon direct contact with the displaceable part, wherein the ramp is formed as an integral part of a mounting plate, having a column switch assembly fastened thereto, that connects the ramp to the upper member.

15. The steering column as claimed in claim 14, wherein the mounting plate extends outwardly to an upper edge, wherein the upper edge is bent over to form the ramp.

16. The steering column as claimed in claim 14, wherein the column switch assembly includes a rigid housing and the ramp is formed as an integral part of the rigid housing.

17. The steering column as claimed in claim 14, wherein the ramp is formed by one or more separate rigid ramp members fastened to the mounting plate.

18. The steering column as claimed in claim 17, wherein each of the one or more separate rigid ramp members is fastened to the mounting plate by welding.

19. The steering column as claimed in claim 17, wherein each of the one or more separate rigid ramp members is fastened to the mounting plate by adhesive bonding.

20. The steering column as claimed in claim 14, wherein the instrument panel displaceable part is hingedly connected to an instrument panel main part at a position spaced away from an inclined abutment surface that faces the ramp.

* * * * *